United States Patent
Kühner et al.

(10) Patent No.: US 7,890,437 B2
(45) Date of Patent: Feb. 15, 2011

(54) CONFIGURATION AND METHOD FOR OPERATING A TECHNICAL INSTALLATION

(75) Inventors: Claus Kühner, Nürnberg (DE); Martin Schneider, Burgthann (DE); Lothar Schwab, New Hope, MN (US); Bun-Kee Wee, Maple Grove, MN (US)

(73) Assignee: Siemens Aktiengesellschaft, Munich (DE)

( * ) Notice: Subject to any disclaimer, the term of this patent is extended or adjusted under 35 U.S.C. 154(b) by 1122 days.

(21) Appl. No.: 11/587,984

(22) PCT Filed: Apr. 21, 2005

(86) PCT No.: PCT/DE2005/000757

§ 371 (c)(1),
(2), (4) Date: Nov. 20, 2006

(87) PCT Pub. No.: WO2005/106602

PCT Pub. Date: Nov. 10, 2005

(65) Prior Publication Data

US 2007/0250188 A1    Oct. 25, 2007

Related U.S. Application Data

(60) Provisional application No. 60/565,513, filed on Apr. 27, 2004, provisional application No. 60/578,317, filed on Jun. 10, 2004.

(51) Int. Cl.
*G06F 17/11* (2006.01)

(52) U.S. Cl. .............................. 706/11; 700/5; 700/83

(58) Field of Classification Search .................. 700/83, 700/5; 707/999.008; 706/11
See application file for complete search history.

(56) References Cited

U.S. PATENT DOCUMENTS

| | | | | |
|---|---|---|---|---|
| 4,831,582 A * | 5/1989 | Miller et al. | ......................... | 1/1 |
| 5,200,564 A * | 4/1993 | Usami et al. | ................... | 84/602 |
| 5,506,984 A * | 4/1996 | Miller | ............................... | 1/1 |
| 5,615,104 A * | 3/1997 | Takai et al. | ...................... | 700/5 |
| 5,893,097 A * | 4/1999 | Hayata et al. | ........................ | 1/1 |
| 6,035,326 A * | 3/2000 | Miles et al. | ................... | 709/206 |
| 6,067,477 A * | 5/2000 | Wewalaarachchi et al. | ..... | 700/83 |
| 6,721,677 B2 * | 4/2004 | Pierce et al. | .................. | 702/127 |
| 6,745,175 B2 * | 6/2004 | Pierce et al. | ........................ | 1/1 |
| 6,973,473 B1 * | 12/2005 | Novaes et al. | ................ | 709/201 |
| 2002/0161452 A1 * | 10/2002 | Peltier | ............................ | 700/2 |

(Continued)

*Primary Examiner*—Michael B. Holmes
*Assistant Examiner*—David H Kim
(74) *Attorney, Agent, or Firm*—Laurence A. Greenberg; Werner H. Stemer; Ralph E. Locher

(57) ABSTRACT

A computer-aided configuration for a technical installation includes a presentation layer with operator control interfaces, an application layer containing all applications, a realtime basic processing layer for providing all applications and operator control interfaces with information and a data manager for creating and maintaining data models for operating and system functions. One such configuration is constructed in such a way that the structure thereof is favorable to extension and offers high availability. The applications in the realtime basic processing layer are respectively combined to form bundles, wherein the same data model is respectively common to the applications of a bundle. The data of a respective application bundle is stored in an application bundle storage unit as shared memory mapped files. A method for operating such a configuration includes storing the data in the realtime basic processing layer in an application bundle storage unit as shared memory mapped files.

19 Claims, 2 Drawing Sheets

U.S. PATENT DOCUMENTS

2002/0161453 A1* 10/2002 Peltier ........................ 700/5
2003/0097381 A1* 5/2003 Detweiler et al. ........... 707/201
2004/0006652 A1* 1/2004 Prall et al. .................. 709/318

* cited by examiner

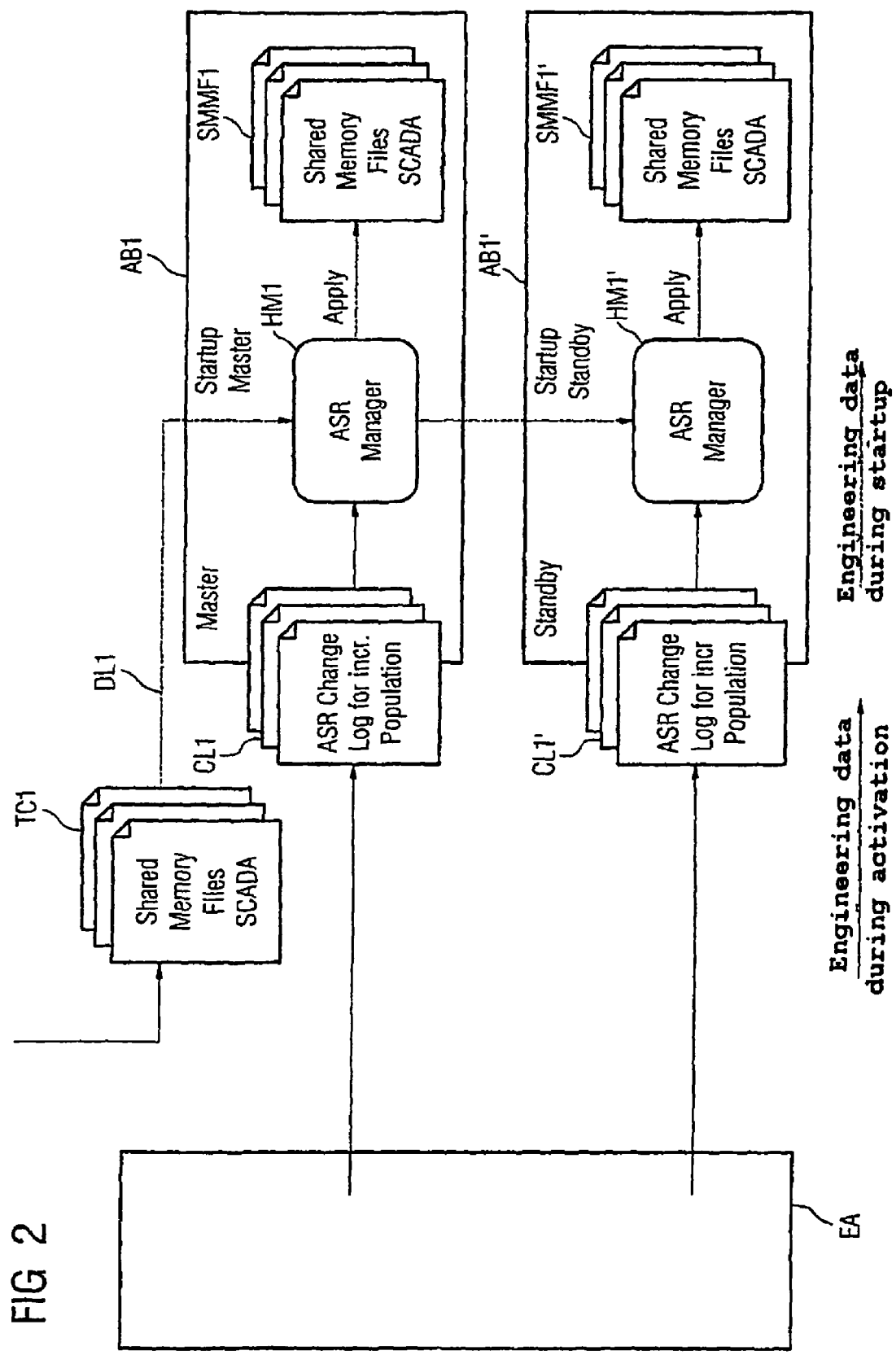

CONFIGURATION AND METHOD FOR OPERATING A TECHNICAL INSTALLATION

BACKGROUND OF THE INVENTION

Field of the Invention

The invention relates to a computer-aided configuration with a layer structure for a technical installation having a presentation layer with operator control interfaces for operation and engineering, an application layer containing all the applications, a realtime basic processing layer for supplying all applications and operator control interfaces with information about the technical installation, and a data manager for creating and maintaining data models for operating and system functions. In this context, "layer" within the meaning of the invention is understood to mean a layer which provides a defined functionality, i.e. is used for processing and/or presenting data. The presentation layer may be in the form of a graphics editor with a visual display interface, for example. Within the meaning of the invention, a technical installation is any electrical, industrial engineering and process engineering installation the operation of which is controlled and monitored, such as a power supply control configuration or a biochemical production plant.

Thus, by way of example, a technical installation within the meaning of the invention in the form of a configuration is known from the Siemens publication "Spectrum PowerCC Produkt-Übersicht" [Spectrum PowerCC Product Overview], Release: April 2003 SPC-AS-AV-03.01.00-DE. This known configuration, which is used for system management of electrical power supply networks and of gas and water supply networks, contains a presentation layer with operator control interfaces both for operation and for engineering, engineering meaning, inter alia, system administration and database maintenance. In addition, the known configuration has an application layer which contains all the applications. By way of example, the applications include what is known as a historical information system, power accounting and load management. In addition, the known configuration is provided with a realtime basic processing layer which is used to supply all applications and operator control interfaces with information about the supply network. Furthermore, the known configuration has a data manager which is used to create and maintain data models for operating and system functions.

SUMMARY OF THE INVENTION

The invention is based on the object of constructing a computer-aided configuration so that it is implemented with a high level of availability in a manner which favors expansions and adjustments.

The invention achieves this object in a computer-aided configuration of the type indicated at the outset by respectively combining the applications to form application bundles in the realtime basic processing layer, the applications in an application bundle having the same data model common to them; the data in a respective application bundle are stored in an application bundle storage device, which is in the form of Shared Memory Mapped Files. In this case, an application bundle is a number of applications which use exclusively one application type, e.g. SCADA (Supervisory Control And Data Acquisition) applications. Shared Memory Mapped Files in this context are understood to mean a memory structure as described by way of example in "Solaris Internals" (Jim Mauro, Richard McDougall Prentice Hall PTR 2000), for example.

In the case of the configuration according to the invention, the applications are therefore combined into application bundles which are frequently also called application suites. Each application bundle in this case is a logical group of applications which have a common data model. In this context, the data model can be optimally aligned with the needs and requirements in the individual case. In addition, various application bundles or Shared Memory Mapped Files can be installed on a single server or can be distributed over a plurality of servers. The same architecture can therefore be used for units of different size. This grouping/modularity affords the possibility of parallel development with no/few dependencies between various application bundles, which also significantly simplifies testing.

In the realtime basic processing layer, the applications are respectively combined to form application bundles, with each application bundle having a respective underlying data model. The data in a respective application bundle are stored in an application bundle storage device, which is in the form of Shared Memory Mapped Files, on the basis of the underlying data model. The data models of the application bundles in the realtime basic processing layer are associated with the data models of the engineering database by means of an association function, the data in the database being produced by means of the association function and transmitted to the respective application bundles. The configuration according to the invention allows a generic association between the data models of the database and the respective applications, data models for their part likewise being able to be generic, e.g. in the form of a standardized data model such as the CIM (Common Information Model) data model.

Advantageously, the respective Shared Memory Mapped Files have data in the database associated with them by means of an auxiliary manager, the association function being assured by means of Change Log files.

Situated between the database and the Change Log files there is a data conditioning unit which takes the association function as a basis for aligning the engineering change data's data model with the data structure of that application bundle in which the respective engineering change data are intended to become active.

In one preferred embodiment, the data conditioning unit produces the Change Log files, and transmits them to the relevant auxiliary managers, only in the event of a change in the data file in the database.

The invention also provides for the Change Log files to contain only the change in the data file in the database, where the change occurs in the form of direct control commands for the relevant auxiliary managers in the Change Log files.

The auxiliary managers do not change the application bundles until after the conclusion of the complete reading-in of the Change Log files. This ensures that inconsistent configuration or control of the technical installation is prevented if the read-in operation is terminated or if the Change Log files are read into one of the auxiliary managers only in part. In this case, the original installation configuration is retained in full. Not until all the desired changes are present in all the relevant auxiliary managers in full is the technical installation controlled.

Another advantage of the configuration according to the invention is that if a server is started up while operation of the configuration is already in progress then the application bundle is already available locally, which means that the system can access it very quickly; this can be done in fractions of seconds or in a few seconds, depending on the size of the respective application bundle or what demands are being made on the application bundles as regards safe and fault-free operation of the technical installation.

The configuration according to the invention is also distinguished by a high level of availability, since the application bundles allow a very high level of autonomy for each individual server as a result of "local" network distribution over the general plurality of servers in the configuration. A server can continue to operate independently even if another server has failed.

Another advantage of the configuration according to the invention is considered to be that the data model of the application bundles can be optimized as regards operating data flow and process flow.

In the configuration according to the invention, the respective Shared Memory Mapped Files have, through a respective auxiliary manager, associated Change Log files which can have engineering change data applied to them from the data manager. In this context, Change Log files are understood to be devices to which it is firstly possible to write the engineering change data and which can secondly be retrieved upon command. This advantageously also provides the option of having incremental changes in engineering data in the form of engineering change data become active in the configuration in a very short time in the course of operation. This refinement therefore permits the engineering change data to be generated "offline" independently of operation in progress and to be stored in the data manager separately from the rest of the engineering data; if required, they can be supplied to the Shared Memory Mapped Files via the Change Log files—under the control of the auxiliary manager.

In the configuration according to the invention, the auxiliary manager can advantageously also have the operating data applied to it and keeps the Shared Memory Mapped Files adjusted.

Advantageously, the auxiliary manager is preceded by Thin Client interfaces in the direction of action, which interfaces can be used to supply the operating data. In this case, Thin Client interfaces are understood to mean units which run the process of distribution and of application update in optimum fashion. A refinement of this kind speeds up the supply of operating data to the auxiliary manager.

The configuration according to the invention advantageously permits a refinement in which the auxiliary manager forms a master manager by virtue of its having an associated further auxiliary manager operatively connected to it as a redundant auxiliary manager; the further auxiliary manager is preceded by further Change Log files in the direction of action as redundant Change Log files and is succeeded by further Shared Memory Mapped Files in the direction of action as redundant Shared Memory Mapped Files. In this refinement of the configuration according to the invention, starting up a redundant computer advantageously involves the content of the Shared Memory Mapped Files being transferred to the further Shared Memory Mapped Files, which happens in a very short time. In the event of an error being detected, it is thus possible to change over in a very short time.

To achieve changeover as quickly as possible, the auxiliary managers are operatively connected to activation agents which can be controlled by an activation manager in a basic system in the configuration; the activation manager acts directly on the data manager.

To have the incremental changes in engineering data become active in the configuration in simple fashion in the course of operation, the engineering change data are stored separately in a database, storing the engineering data and the engineering change data, in the data manager.

The same purpose is served by a refinement of the configuration according to the invention in which the database and the Change Log files have a data conditioning unit between them which aligns the engineering change data's data model with the data structure of that application bundle in which the respective engineering change data are intended to become active.

The invention also relates to a method for operating a computer-aided configuration having a presentation layer with operator control interfaces for operation and engineering, an application layer containing all the applications, a realtime basic processing layer for supplying all applications and operator control interfaces with information about the supply network, and a data manager for creating and maintaining data models for operating and system functions, and, to achieve a high level of availability, proposes that, in line with the invention, in the realtime basic processing layer, the data in a respective application bundle including combined applications with the same data model be stored in an application bundle storage device which is in the form of Shared Memory Mapped Files.

In the case of the configuration according to the invention, the applications are therefore combined into application bundles which are frequently also called application suites. Each application bundle in this case is a logical group of applications which have a common data model. The data model can be optimally aligned with the needs and requirements in the individual case. In addition, the application bundles or Shared Memory Mapped Files can be installed on a single server or can be distributed over a plurality of servers. The same architecture can therefore be used for units of different size. In addition, testing is simplified.

Another advantage of the configuration according to the invention is that if a server is started up while operation of the configuration is already in progress then the application bundle is already available locally, which means that the system can access it very quickly; this can be done in fractions of seconds or in a few seconds, depending on the size of the respective application bundle.

The configuration according to the invention is also distinguished by a high level of availability, since the application bundles allow a very high level of autonomy for each individual server as a result of "local" network distribution over the general plurality of servers in the configuration. A server can continue to operate independently even if another server has failed.

Another advantage of the configuration according to the invention is considered to be that the data model of the application bundles can be optimized as regards operating data flow and process flow.

In one advantageous embodiment of the inventive method, operating data are supplied directly to an auxiliary manager of an application bundle storage device, which is in the form of Shared Memory Mapped Files, for storing a respective data model's applications which have respectively been combined to form application bundles, while engineering data and engineering change data are supplied to the auxiliary manager using preceding Change Log files. This is advantageous particularly because it means that the engineering data or engineering change data can be prepared offline independently of operation in progress.

It may also be advantageous if the operating data are supplied to the auxiliary manager directly or using Thin Client interfaces.

Advantageously, the auxiliary managers have control signals from an activation agent applied to them, said activation agent being controlled by an activation manager in a basic system in the configuration. This allows incremental changes in the engineering data to be made in controlled fashion when required.

In addition, it is considered advantageous for achieving a redundantly executed method if, in the case of the inventive method, in the event of an error a further auxiliary manager which is connected firstly to further Change Log files, corresponding to the one Change Log files, and secondly to further Shared Memory Mapped Files, corresponding to the one Shared Memory Mapped Files, reads the further Change Log files and applies the data which have been read to the further Shared Memory Mapped Files.

To achieve a way of making incremental changes in the engineering data in the course of operation, it is considered advantageous if the engineering change data are stored separately in a database in the engineering unit during operation of the configuration, independently of the progression thereof, the stored data are then conditioned, independently of the operation of the configuration, such that they match the application bundle's data structure, and are then stored in the Change Log files.

A fundamental advantage of this type of implementation of the inventive method is that the relatively time-consuming validation of the engineering change data can be performed without influencing the operation of the configuration, to a certain extent that is to say in parallel or outside of the actual operation. The conditioning of the engineering change data for later transfer to the Shared Memory Mapped Files can also take place "offline" accordingly. Storage in the Change Log files is also effected in this manner, which means that when the auxiliary managers are activated by the activation agents the engineering change data can be transferred very quickly to Shared Memory Mapped Files or to the operational management system of the configuration.

BRIEF DESCRIPTION OF THE DRAWINGS

FIG. 2 shows a unit of redundant construction with Change Log Files, auxiliary manager and application bundle storage device.

DESCRIPTION OF THE PREFERRED EMBODIMENT

Figure 1:
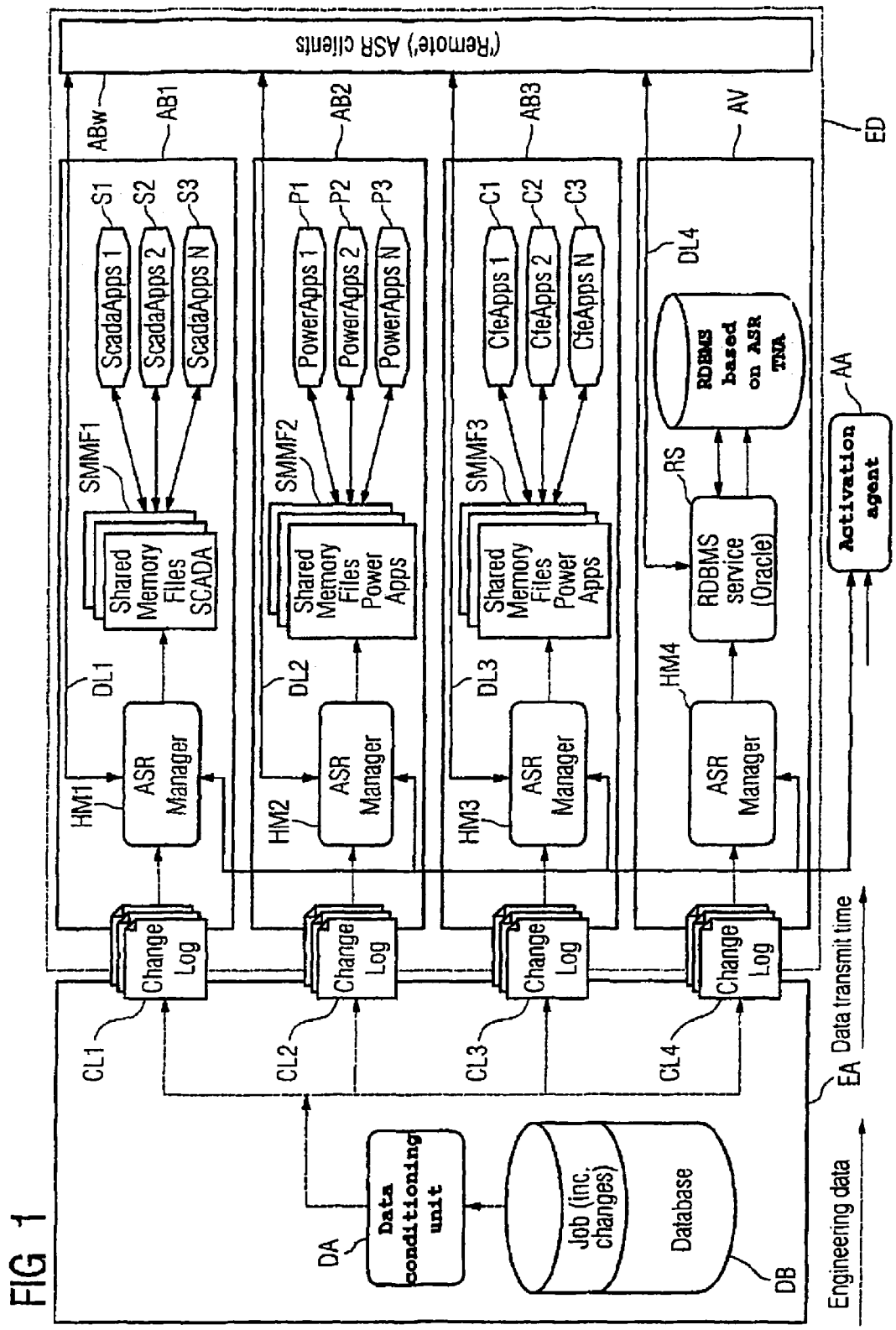
FIG. 1 shows an exemplary embodiment of the configuration according to the invention with its elements which are fundamental to the invention.

As FIG. 1 reveals, the configuration according to the invention has an engineering unit EA which is part of the aforementioned data manager in the configuration of the generic type. The engineering unit EA contains a database DB which contains engineering data, that is to say data which relate to system administration and domain data/database maintenance, inter alia. The engineering unit EA provides users with the opportunity to group/store their data changes in logically separate orders, known as jobs, in the database. The function and object of the jobs will be discussed in more detail at a later juncture. A data conditioning unit DA connects the engineering unit EA to Change Log files CL1, CL2, CL3 and CL4 from application chips AB1, AB2, AB3 in a realtime basic data processing unit ED in a realtime basic processing layer (not shown further). Each of these application chips AB1 to AB3 has an application bundle storage device SMMF1, SMMF2 and SMMF3, which is in the form of Shared Memory Mapped Files, with which applications S1 to S3 and P1 to P3 and also C1 to C3, with their respective matching data model, communicate.

In this context, the applications S1 to S3 are system startup applications, as are known as SCADA. These are to be understood to mean process data processing and calculation, alarm processing, presentation and control, including of network-topological switching actions. The applications P1 to P3 relate to power accounting and the recording and processing and also storage of power meter values. The applications C1 to C3 are used to link remote control appliances to the configuration.

The realtime basic processing unit ED also contains an archive chip AV which includes archives based on RDBMS (Relational Database Management System) Oracle.

As FIG. 1 also shows, each application chip AB1 to AB3 and the archive chip AV contain an auxiliary manager HM1, HM2, HM3 and HM4 which respectively set up a connection to the preceding Change-Log files CL1 to CL4 and the succeeding application bundle stores SMMF1 to SMMF3 and also to the RDBMS service RS of the archive chip AV. Each of the auxiliary managers HM1 to HM3 of the application chips AB1 to AB3 can have operating data applied to it via data lines (cf. FIG. 2, data line DL1). In this case, these operating data can be supplied to the respective auxiliary manager directly or via respective "thin clients" TC1, which may also be in the form Shared Memory Mapped Files.

The auxiliary managers HM1 to HM3 are connected by means of data lines DL1 to DL3 to further appropriate application chips Abw; a similar situation applies to the RDBMS service RS, which uses a further data link DL4 to communicate with the further application chips.

In the configuration according to the invention, the database DB in the engineering unit EA stores, inter alia, orders, known as jobs, which are used as engineering change data for changing engineering data incrementally. These orders, which are worked out offline independently of the operation of the configuration and are stored in the database DB, are implemented in the data conditioning device DA upon activation an activation manager—not shown—such that their data structure matches that of the data model of the respective application chip AB1 to AB3. The engineering change data implemented in this manner are stored in the Change Log files CL1 to CL3. To make these engineering change data active in the application chip AB1 to AB3, an activation agent AA is used which is actuated by means of the aforementioned activation manager. This activation agent AA is connected to the auxiliary managers HM1 to HM3 and, when actuated, causes the auxiliary managers HM1 to HM3 to activate the engineering change data stored in the Change Log files CL1 to CL3; these engineering change data are therefore transferred to the Shared Memory Mapped Files SMMF1 to SMMF3 abruptly to a certain extent. In this context, the processing of operating data must be interrupted only very briefly, because the engineering change data are already present in a prepared data structure.

FIG. 2 uses the application chip AB1 shown in FIG. 1 to show an embodiment in which the application chip AB1 has a further application chip AB1' associated with it in parallel. The further application chip AB1' has a further auxiliary manager HM1', further Change Log files CL1' and further Shared Memory Mapped files SMMF1'. The input side of the two Change Log files CL1 and CL1' is connected to the engineering unit (shown here only schematically). This produces a redundant construction in which synchronous operation of the two application chips AB1 and AB1' is assured, the duplicate form of Change Log files CL1 and CL1' again providing the option of changing engineering data offline and then storing them in a suitable data structure in these Change Log files CL1 and CL1'.

Appropriately redundant embodiments can be produced for the application chips AB2 and AB3 shown in FIG. 1. This produces a high level of reliability for the configuration according to the invention.

We claim:

1. A computer-aided configuration for a technical installation, the configuration comprising:
    a presentation layer with operator control interfaces for operation and engineering;
    an application layer containing all applications;
    an engineering unit having a data manager for creating and maintaining data models for operating and system functions;
    a realtime basic processing layer for supplying all of said applications and operator control interfaces with information about the technical installation;
    said applications in said realtime basic processing layer being respectively combined to form application bundles, and each of said application bundles having a respective underlying data model;
    said application bundles respectively storing data in an application bundle storage device in the form of Shared Memory Mapped Files, on the basis of said underlying data model;
    a database having data models, said data models of said application bundles in said realtime basic processing layer being associated with said data models of said database by an association function, and data in said database being transmitted to said respective relevant application bundles in line with said association function; and
    a respective auxiliary manager associating said respective data in said database with said respective Shared Memory Mapped Files, and Change Log files assuring an association function between said data models.

2. The configuration according to claim 1, which further comprises a data conditioning unit disposed between said database and said Change Log files, said data conditioning unit taking said association function as a basis for aligning a data model of engineering change data with a data structure of said application bundle in which respective engineering change data become active.

3. The configuration according to claim 2, wherein said data conditioning unit produces said Change Log files and transmits said Change Log files to said relevant auxiliary managers, only in the event of a change in a data file in said database.

4. The configuration according to claim 3, wherein said Change Log files contain only said change in said data file in said database.

5. The configuration according to claim 3, wherein said change in said data file in said database occurs in the form of directly readable control commands for said relevant auxiliary managers in said Change Log files.

6. The configuration according to claim 3, wherein said auxiliary managers do not change said application bundles until after conclusion of a complete reading-in of said Change Log files.

7. The configuration according to claim 1, wherein operating data are applied to said auxiliary manager, and said auxiliary manager keeps said Shared Memory Mapped Files adjusted.

8. The configuration according to claim 7, which further comprises Thin Client interfaces preceding said auxiliary manager in a direction of action, said Thin Client interfaces being used to supply said operating data.

9. The configuration according to claim 1, which further comprises: a further auxiliary manager associated with and operatively connected to said auxiliary manager as a redundant auxiliary manager to form a master manager; further Change Log files preceding said further auxiliary manager in a direction of action as redundant Change Log files; and further Shared Memory Mapped Files succeeding said further auxiliary manager in said direction of action as redundant Shared Memory Mapped Files.

10. The configuration according to claim 1, which further comprises activation agents operatively connected to said auxiliary managers, said activation agents to be controlled by one of said activation managers in a basic system in the configuration, and said activation manager acting directly on said engineering unit.

11. The configuration according to claim 2, wherein said engineering unit has a database storing engineering data and said engineering change data and separately storing said engineering change data.

12. The configuration according to claim 1, wherein the technical installation is a supply network.

13. The configuration according to claim 1, wherein the technical installation is a high-voltage, gas or water supply network.

14. A method for operating a computer-aided configuration, which comprises the following steps:
    providing a layer structure for a supply network, having a presentation layer with operator control interfaces for operation and engineering, an application layer containing all applications, a realtime basic processing layer for supplying all applications and operator control interfaces with information about the supply network, and a data manager for creating and maintaining data models for operating and system functions;
    storing the data in a respective application bundle, including combined applications with the same data model, in an application bundle storage device in the form of Shared Memory Mapped Files, in the realtime basic processing layer; and
    supplying operating data directly to an auxiliary manager of an application bundle storage device in the form of Shared Memory Mapped Files, for storing an application of a respective data model having been respectively combined to form application bundles, while supplying engineering data and engineering change data to the auxiliary manager using preceding Change Log files.

15. The method according to claim 14, which further comprises supplying the operating data to the auxiliary manager directly or by using Thin Client interfaces.

16. The method according to claim 14, which further comprises applying control signals from an activation agent to the auxiliary manager, and controlling the activation agent by an activation manager in a basic system in the configuration.

17. The method according to claim 14, which further comprises in the event of an error, a further auxiliary manager connected firstly to further Change Log files, corresponding to the one Change Log file, and secondly to further Shared Memory Mapped Files, corresponding to the one Shared Memory Mapped File, reads the further Change Log files and applies the data which have been read to the further Shared Memory Mapped Files.

18. The method according to claim 14, which further comprises: storing the engineering change data separately in a database in an engineering unit during operation of the configuration, independently of a progression thereof; conditioning the stored data, independently of the operation of the configuration, to match a data structure of the application bundle; and then storing the data in the Change Log files.

19. The method according to claim 18, which further comprises reading the data stored in the Change Log files during activation of the auxiliary managers and supplying the data to the Shared Memory Mapped Files.

* * * * *